United States Patent
Bhagat et al.

(10) Patent No.: US 7,793,094 B2
(45) Date of Patent: Sep. 7, 2010

(54) HTTP COOKIE PROTECTION BY A NETWORK SECURITY DEVICE

(75) Inventors: Darshant B. Bhagat, Santa Clara, CA (US); Manjeri Krishnan, Sunnyvale, CA (US); Karthikeyan M. Sadhasivam, San Jose, CA (US); Ravi K. Varanasi, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1177 days.

(21) Appl. No.: 11/406,107

(22) Filed: Apr. 18, 2006

(65) Prior Publication Data
US 2007/0245137 A1    Oct. 18, 2007

(51) Int. Cl.
*H04L 29/06*    (2006.01)
*G06F 21/00*    (2006.01)
(52) U.S. Cl. ........................................ 713/153; 713/185
(58) Field of Classification Search ........................ None
See application file for complete search history.

(56) References Cited

U.S. PATENT DOCUMENTS

| | | | |
|---|---|---|---|
| 6,154,775 A | 11/2000 | Coss et al. | |
| 6,681,331 B1 | 1/2004 | Munson et al. | |
| 6,708,212 B2 | 3/2004 | Porras et al. | |
| 6,711,615 B2 | 3/2004 | Porras et al. | |
| 6,715,084 B2 | 3/2004 | Aaron et al. | |
| 6,785,818 B1 | 8/2004 | Sobel et al. | |
| 6,851,060 B1 | 2/2005 | Shrader | |
| 2002/0055912 A1 | 5/2002 | Buck | |
| 2004/0011635 A1 | 1/2004 | Adams | |
| 2005/0022018 A1 | 1/2005 | Szor | |
| 2006/0101114 A1* | 5/2006 | Sandhu et al. | 709/203 |

* cited by examiner

*Primary Examiner*—Brandon S Hoffman
(74) *Attorney, Agent, or Firm*—The Law Offices of Bradley J. Bereznak

(57) ABSTRACT

An intrusion detection system and method for a computer network includes a processor and one or more programs that run on the processor for application inspection of data packets traversing the computer network. The one or more programs also obtaining attribute information from the packets specific to a particular application and comparing the attribute information against a knowledge database that provides a baseline of normal network behavior. The processor raises an alarm whenever the attribute information exceeds a predetermined range of deviation from the baseline of normal network behavior.

12 Claims, 5 Drawing Sheets

HTTP COOKIE PROTECTION BY A NETWORK SECURITY DEVICE

FIELD OF THE INVENTION

The present invention relates generally to the field of web browsing; more particularly, to apparatus and methods employed for the purpose of securing networks, applications, or user devices from attacks initiated by malicious individuals or systems.

BACKGROUND OF THE INVENTION

With the rapid growth of the Internet and computer network technology in general, network security has become a major concern to companies around the world. The fact that the tools and information needed to penetrate the security of corporate networks are widely available has only increased that concern.

Confidential information normally resides in two states on a computer network. It can reside on physical storage media, such as a hard disk or memory of a device such as a server, or it can reside in transit across the physical network wire in the form of packets. A packet is a block of data that carries with it the information necessary to deliver it, analogous to an ordinary postal letter that has address information written on the envelope. A data packet switching network uses the address information contained in the packets to switch the packets from one physical network connection to another in order to deliver the packet to its final destination. Gateways and routers are devices that switch packets between the different physical networks. The format of a packet is usually defined according to a certain protocol. For example, the format of a packet according to the widely-used Internet protocol (IP) is known as a datagram.

These two information states present multiple opportunities for attacks on a company's internal network, as well as on the applications and user devices running on the network or at a data center (DC). An attack is simply when a person or machine accesses information without authorization, or when they attempt to do something undesirable to a network or its resources. By way of example, an IP spoofing attack occurs when an attacker outside of an internal network pretends to be a trusted computer either by using an IP address that is within the range of IP addresses for that network or by using an authorized external IP address that is trusted to access specified network resources.

Application layer attacks exploit well-known weaknesses in software commonly found on servers. By exploiting these weaknesses, attackers can gain access to a computer with the permissions of the account running the application, which is usually a privileged, system-level account. Newer forms of application layer attacks take advantage of the openness of technologies such as the HyperText Markup Language (HTML) specification, web browser functionality, and the HyperText Transfer Protocol (HTTP) protocol. These attacks, which include Java applets and ActiveX controls, typically involve passing harmful programs across the network and loading them through a user's web browser. (A web browser is a software application used to locate and displays web pages.)

The HTTP protocol is the underlying protocol used by the World Wide Web (www). Basically, HTTP defines how messages are formatted and transmitted, and what actions web servers and web browsers should take in response to various commands. For example, when a person enters a uniform resource locator (URL; the global address of documents on the World Wide Web) in a browser, this sends an HTTP command to the web server, directing it to fetch and transmit the requested web page.

HTTP is a stateless protocol; that is, it does not inherently correlate request/response messages with earlier transactions between the same client and server. Cookies have been developed as a mechanism to overcome this deficiency in the HTTP protocol. A cookie is simply a token or message given to a web browser by a web server/application. Each cookie has a domain and a path. The domain tells the browser to which web domain the cookie should be sent, and the path specifies a directory where the cookie is active. Each cookie also typically has an expiry date, after which time it is trashed. The client web browser typically stores the cookie in a text file. The cookie is then sent back to the server each time the browser requests a page from the server. The main purpose of cookies therefore is to indicate a specific client state in an application, and to identify clients/users and possibly prepare customized web pages for them. By way of further background, U.S. Pat. No. 6,851,060 describes a mechanism to dynamically present basic authentication and cookie information to a web browser user.

Unfortunately, the security provided by most web browsers is often inadequate, especially in situations where the cookie generated by the server has user or subscriber identity information and/or credentials. For example, it is fairly easy for an attacker to intercept or "mine" a cookie, analyze it, and possibly tamper with the cookie. In other cases, unscrupulous hackers or others may attempt to steal credentials contained in a cookie in order to impersonate a person/client. Cookie "poisoning" is a known technique mainly for achieving impersonation and breach of privacy through manipulation of session cookies. Using this technique, an attacker can impersonate a valid user and thus gain information and perform actions on behalf of the victim.

A number of different security devices and techniques have been developed to combat the problem of security attacks. One type of device that is typically used to control data transfer between an internal, private network and an open, external network such as the Internet is known as a "firewall". Firewalls are usually routers that are configured to analyze and filter data packets entering an internal network from an external network source. For example, U.S. Pat. No. 6,154,775 teaches a computer network firewall that authorizes or prevents certain network sessions using a dependency mask, which can be set based on session data items such as the source host address. Additionally, U.S. Patent Publication No. 2002/0055912 teaches a network consisting of member users and member vendors along with a method of protecting users by cookie-removal protection when browsing a non-member site.

U.S. Patent Publication No. 2004/0111635 teaches an information processing system and method that includes a cookie encryption scheme in a firewall unit to defend against TCP-based denial of service (DoS) attacks. One of the drawbacks of many cookie encryption schemes of application firewall devices is that signature databases must be constantly updated, and the system must be able to compare and match activities against large collections of attack signatures. That is to say, they only operate on known attacks. In addition, if signatures definitions are too specific, or if the thresholds are incorrectly set, these intrusion detection systems may miss variations on known attacks. The application firewall thresholds and signatures also need to be configured for each branch/installation of the network. For a large corporation (e.g., an international bank) the overhead associated with maintaining the signature database information can be costly.

Similar to firewalling, another prior art approach aimed at achieving network/application security is the use of a security engine or network security box that is installed at the gateway to the data center network containing the server forms and application servers. The security engine functions to intercept traffic coming from the servers, inspect the data packets, and extract the cookie from the data packets. In what is commonly known as state-full cookie security, the extracted cookie may be encrypted, with the encrypted contents of the cookie being stored on the security engine. The data packet with the plain text cookie is then sent across a network to the destination endpoint device (i.e., the client browsing the specific server). Upon return transmission, an entering packet passes through an inbound interface of the security engine. Here, the packet is checked against a state-full session table and passed forward to the application server if it is identifies as part of an already established flow. If the packet is identified as part of a new session it may be checked against an access-list. In this latter case, the cookies of the incoming packets may be extracted, encrypted, and then checked against a database of stored encrypted cookies.

One drawback of the state-full cookie security approach is that it requires significant computational and data storage resources to maintain the state information of all the different traffic flows. The time it takes to extract and encrypt cookies of incoming packets also makes the state-full approach vulnerable to denial of service attacks. Additionally, confidentiality of the information is potentially compromised since the plain text form of the cookie is still transmitted across the network all the way to the client endpoint device.

In view of the aforementioned problems in the prior art there remains an unsatisfied need for a mechanism capable of protecting cookies from being tampered or mined for their contents or structure, while obviating the need for maintaining a large record or database of the cookies on a network security device.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A network security device and method is described that provides tamper resistance (i.e., "tamperproofing") and protection against mining of cookie structures. In the following description specific details are set forth, such as device types, protocols, configurations, etc., in order to provide a thorough understanding of the present invention. However, persons having ordinary skill in the networking arts will appreciate that these specific details may not be needed to practice the present invention.

In the context of the present application, it should be understood that a computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 5:
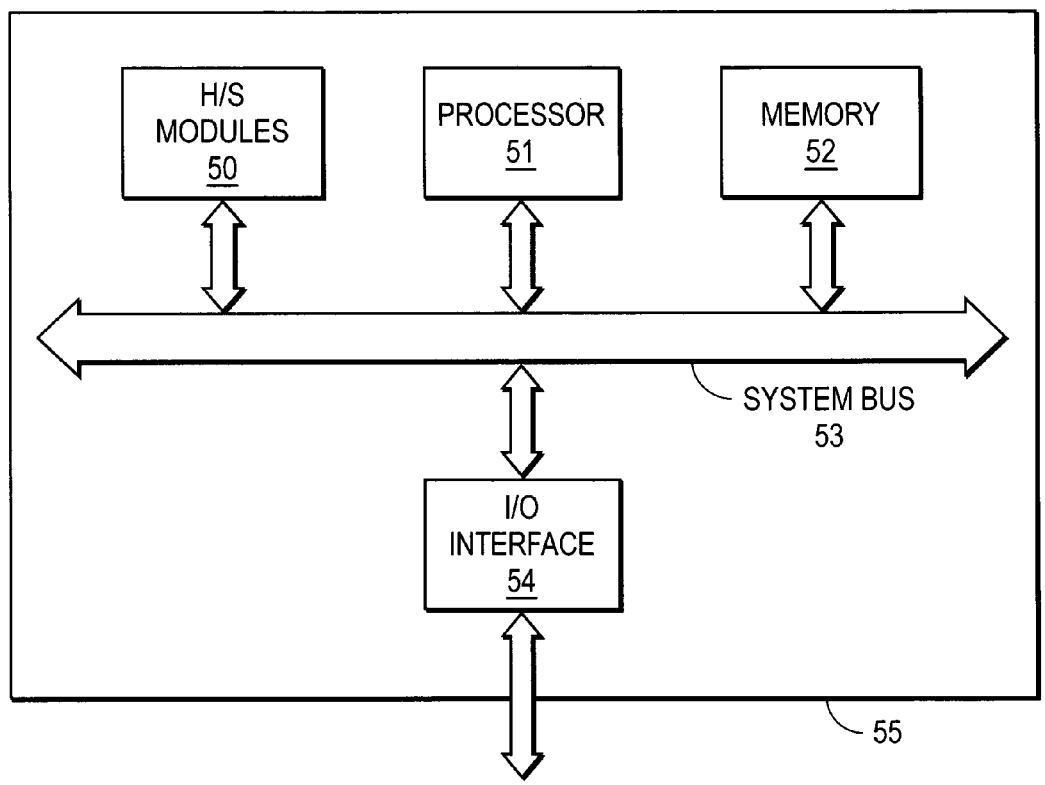
FIG. 5 is a circuit block diagram showing the basic architecture of a network intrusion detection device according to one embodiment of the present invention.

As shown in FIG. 5, each node 55 typically comprises a number of basic subsystems including a processor subsystem 51, a main memory 52 and an input/output (I/O) subsystem or interface 54. Various hardware and software modules 50 may also be included to implement specialized functions or to execute certain specific tasks (e.g., data encryption). Data is transferred between processor subsystem 51, the main memory 52 ("system memory"), modules 52, and I/O interface 54 over a system bus 53. Examples of the system bus may include the conventional lightning data transport (or hyper transport) bus and the conventional peripheral component interconnect (PCI) bus. It is appreciated that other buses, such as a dedicated memory bus between processor subsystem 51 and memory 52 may also be included. Processor subsystem 51 may comprise a single-chip processor and system controller device that incorporates a set of functions including a system memory controller, support for one or more system buses and direct memory access (DMA) engines. In general, the single-chip device is designed for general-purpose use and is not heavily optimized for networking applications. Alternatively, processor subsystem 51 may comprise a multi-processor solution.

Figure 1:
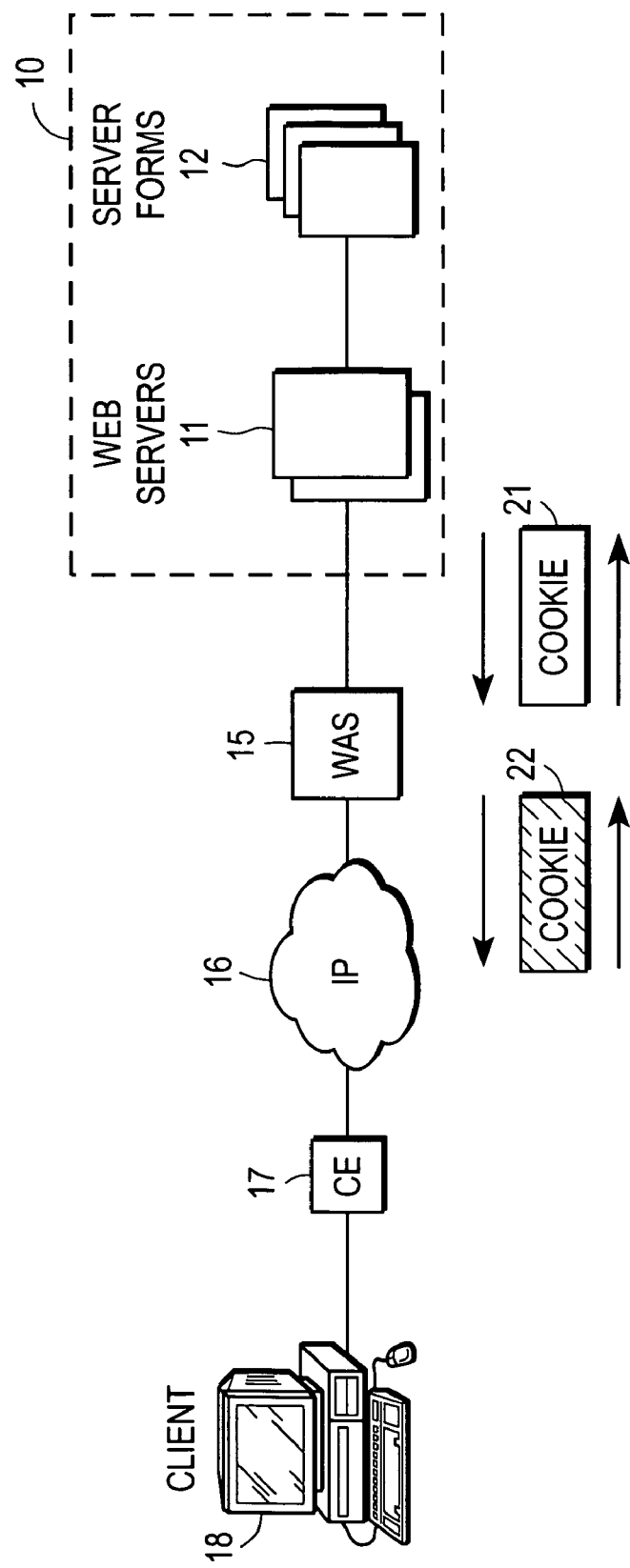
FIG. 1 shows an end-to-end network architecture with cookie protection in accordance with one embodiment of the present invention.

With reference now to FIG. 1, there is shown an exemplary network diagram in accordance with one embodiment of the present invention that includes a data center 10 containing various web servers 11 fronting server forms 12. Data center 10 is connected to an IP network (e.g., the Internet) 16 through a web application security (WAS) device 15. In this example, the client endpoint device is a personal computer (PC) 18 that connects to IP network 16 via a customer edge (CE) device 17. WAS device 15 embodies machine-readable code stored in firmware, software, on a hard disk, etc. for execution on a general purpose processor that protects cookies from being tampered and mined as described in more detail below.

Practitioners in the art will appreciate that WAS device 15 may be embodied in a network device having the basic structure described in conjunction with FIG. 5. WAS device 15 may also be incorporated into a variety of different network devices such as routers, switches, gateway devices, etc. In addition, although the example in FIG. 1 shows WAS device 15 at the gateway to data center 10, it is appreciated that the web application security device of the present invention may reside at a variety of locations within the client/server network. In other words, WAS device 15 may either be located at the gateway near web servers 11 or at a more distant location, e.g., within IP network 16.

WAS device 15 functions to intercept traffic coming from servers 11 and server forms 12 destined for client endpoint devices (e.g., PC 18). To insure confidentiality and to provide protection against cookie structure mining, an original cookie 21 is extracted from the outgoing data packet(s) and encrypted by WAS device 15 using an original, secret key stored within WAS device 15 (e.g., in non-volatile memory). The encrypted cookie 22 is then transmitted the entire way across the network to the destination endpoint device 18 (e.g., a client/user browsing the specific server). In other words, WAS device 15 replaces original cookie 21 with encrypted cookie 22 in the data packets transmitted from the servers/server forms to the client endpoint device.

In addition to being encrypted, outgoing cookie 21 may also be hashed to provide tamperproofing, thereby ensuring the integrity of the cookie contents. WAS device 15 calculates a keyed hash of the cookie, and alters the cookie with the hash value. This key is only known to the security device. In cases were both encryption and hashing are performed, original cookie 21 be hashed first, followed by encryption. In cases where the integrity of the cookie is not an issue or concern, tamperproofing (i.e., hashing) may be performed without encryption. Alternatively, when there is only a need to mask the content of the cookie (e.g., when the cookie carries username, shopping cart, or other confidential information) cookie encryption alone may be performed. When the user has a need for both tamperproofing and confidentiality, both hashing and encryption are employed. Practitioners in the art will appreciate that by processing the cookie sent from the server/application and altering its contents prior to transmission to the client endpoint device the present invention obviates the need to keep any state information on the network security box.

Cryptographic hashing of the cookie by WAS device 15 may be performed in accordance with a variety of known hashing algorithms/functions. For instance, the well-known Hash Message Authentication Code (HMAC) standard, which provides data source authentication and data integrity between two users, may be employed. Other cryptographic hash functions such as MD5, which takes as input a message of arbitrary length and produces as output a 128-bit "fingerprint" or "message digest" of the input, or the Secure Hash Algorithm (SHA) family of cryptographic hash functions, may also be utilized.

Continuing with the example of FIG. 1, upon its arrival at PC device 18 the encrypted and/or hashed cookie 22 is deposited on the client web browser. Note that there is no requirement that the client have the secure key used to perform encryption or hashing. That is, from the client's perspective, PC device 18 simply sees an encrypted cookie. If hashing has been performed, the client device sees the original cookie with a hash or signature added to it. This poses no problem on the client side since the client endpoint device is not supposed to use the cookie for any particular purpose other than for presenting the same credentials on return transmissions when requested by the server.

Upon its return from the client device 18 to WAS device 15, the encrypted and/or hashed cookie 22 is first decrypted by WAS device 15 using the same secure key that was used during the encryption process. Next, if the outgoing cookie was previously hashed, the decrypted cookie is verified for the hash value by WAS device 15. In the event that the hash fails, the packet and/or cookie may be dropped. If the verification is successful cookie 21 is sent to web servers 11 and server forms 12. Since cookie 21 is identical to the cookie that was originally sent to the client, from the server's perspective it looks as if nothing has happened to the original cookie.

In certain embodiments, a tag may be added to the cookie to indicate or identify the operations that have been performed in that particular cookie (e.g., encryption or hashing, or both). That way, if there happen to be multiple web application security devices installed in the outbound path from application servers 11 to client device 18, a particular security device can recognize that encryption and or hashing has ready been performed, and then take no further action. In other words, the tag information may be utilized to allow the cookie to proceed through the network to the client endpoint device without any further (redundant) operations being performed.

In addition, since there may also be multiple paths back from the client to the data center, each web application security device deployed in the network path or as a gateway stores the same in encryption/hash function key information. That is to say, in a clustered environment consisting of two or more similarly configured security boxes that are deployed for scalability, or for a fail-over scenario, when request/response messages arrive in different security boxes the cookies can still be recovered and security checks can still be performed without problem. The reason why is because in such an embodiment all of the security devices are configured with the same secure key information.

Figure 2:
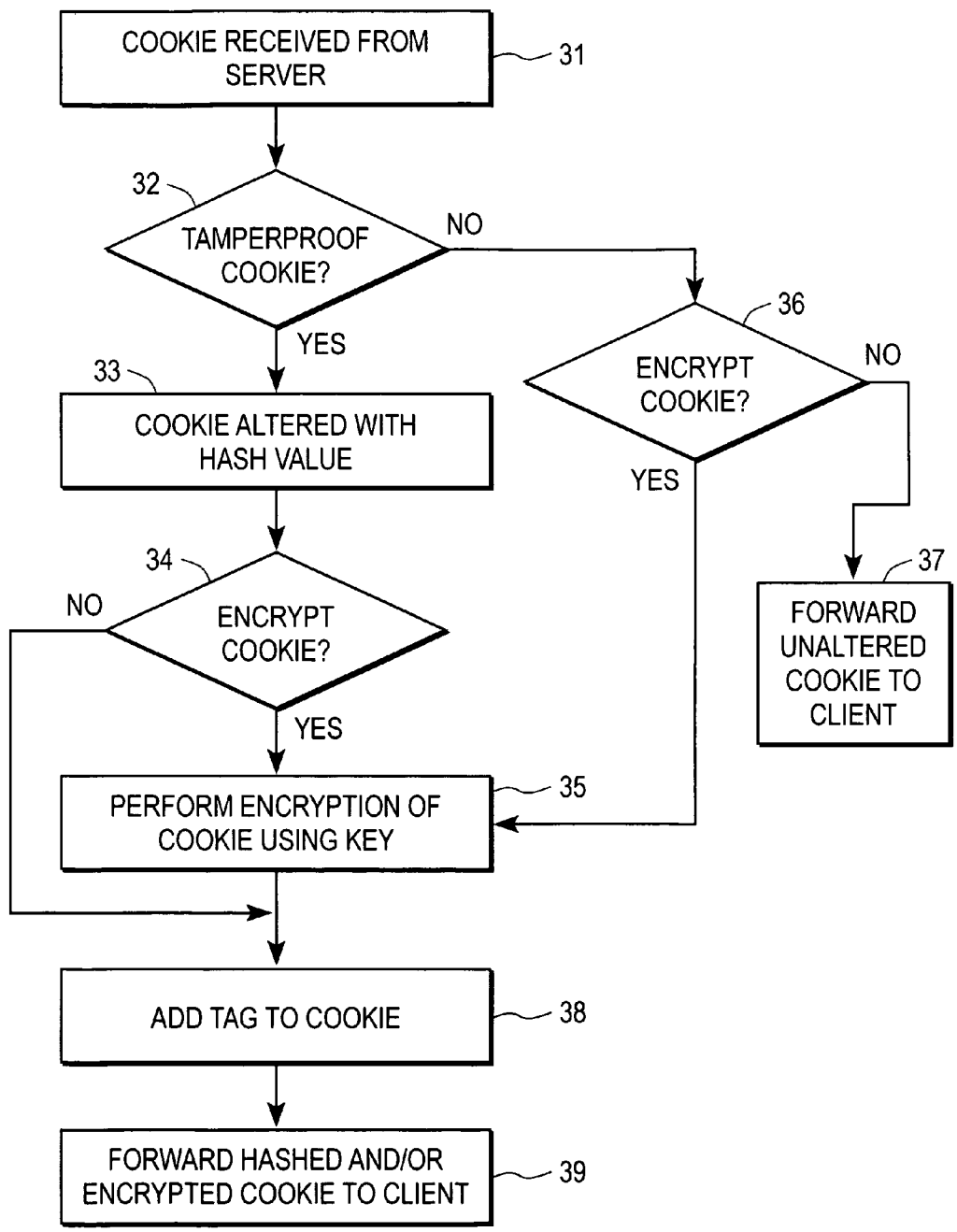
FIG. 2 is a flowchart showing a method of operation according to one embodiment of the present invention.

FIG. 2 is a flowchart describing a basic method of operation according to one embodiment of the present invention. The method of FIG. 2 begins at block 31 with an original cookie created by a web server arriving at a Web application security device before being sent across the IP network to a destination client device. At this point, two decisions are made: whether to tamperproof the cookie (block 32) or to encrypt the cookie (block 36), or both. If neither tamperproofing nor encryption is to be performed, the cookie is simply forwarded "as is"; that is, the original cookie is transmitted in an unaltered state to the client (block 37). If, on the other hand, the cookie is to be tamperproofed, a hashing function is applied to the cookie (block 33). After the hash value has been added to the cookie, encryption of the hashed cookie may be performed using the key stored in the web application security device (block 35).

The next step in the embodiment of FIG. 2 is the adding of tag information to the cookie (block 38). As previously discussed, tag information may be added to indicate the actual operations that have been performed on the cookie by the web application security device. For example, the tag may indicate that the cookie has been tamperproofed (i.e., hashed), encrypted, or both tamperproofed and encrypted. After the appropriate tag has been added to the cookie the altered cookie is forwarded by the web application security device to the client device. Absent somebody tampering with the cookie, or attempting to mine the cookie structure, when the hashed and/or encrypted cookie arrives back at the same (or different) security device from the client's web browser, it should be in the identical state as it was when it was forwarded from the security device to the client endpoint device.

Figure 3:
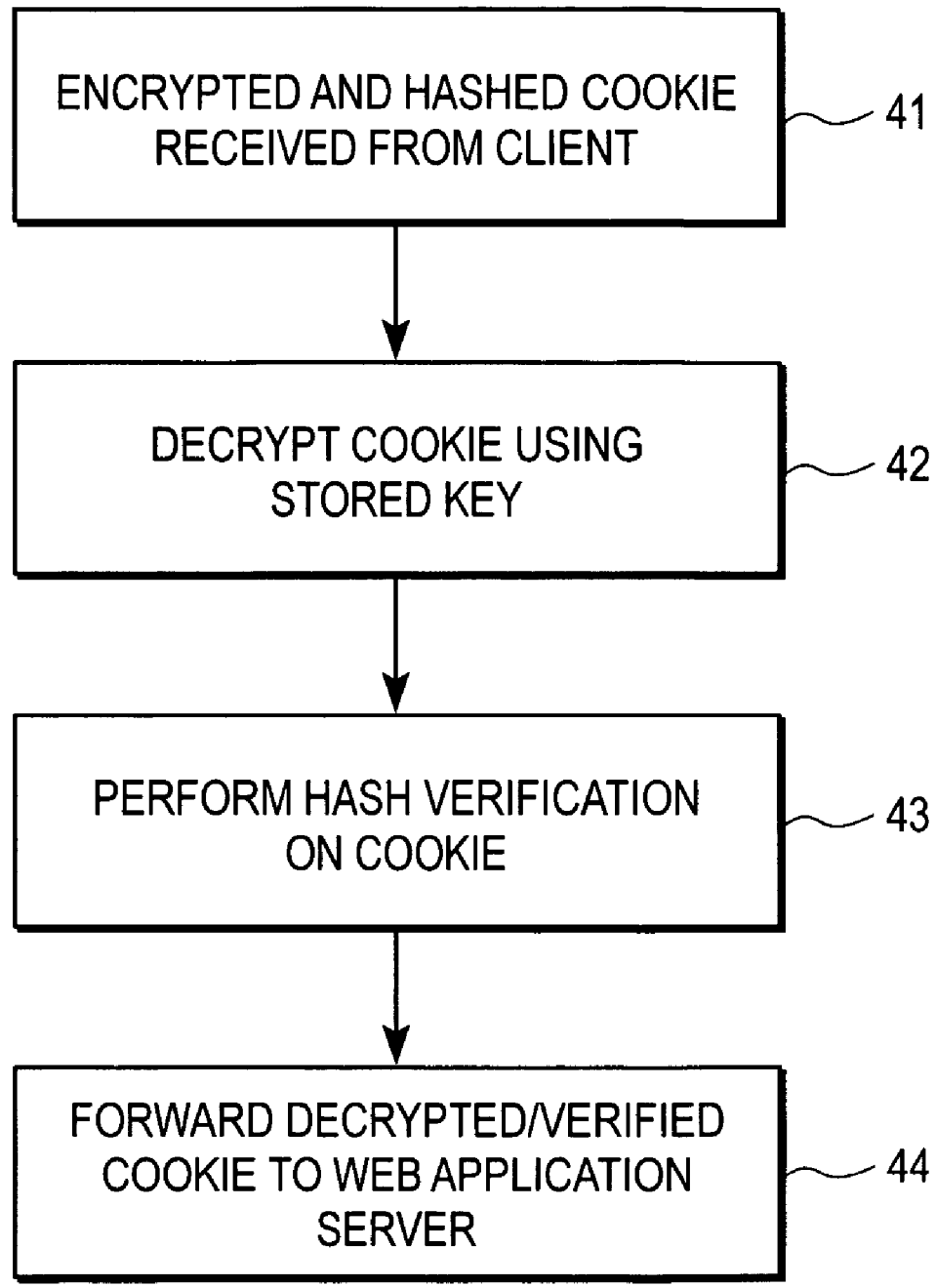
FIG. 3 is a flowchart showing a method of operation according to another embodiment of the present invention.

FIG. 3 is a flowchart illustrating operations performed by the web application security device on a cookie that has been returned by the client device (destined for the application server) according to another embodiment of the present invention. In this example, an encrypted and hashed cookie sent by the client is intercepted by the web application security device before it is permitted to reach the application servers within the data center (block 41). First, the received cookie is decrypted using the same stored key that was previously used to encrypt the original cookie (block 42). Next, hashed verification is performed on the cookie using the identical hash function previously used to tamperproof the cookie (block 43). It is appreciated that if decryption or hash verification fails, the cookie (and possibly the data packet associated with the cookie) may be discarded at this point. If decryption and hash verification is successful, the decrypted/ verified cookie is forwarded to the web application server as previously described (block 44).

Figures 4A, 4B:
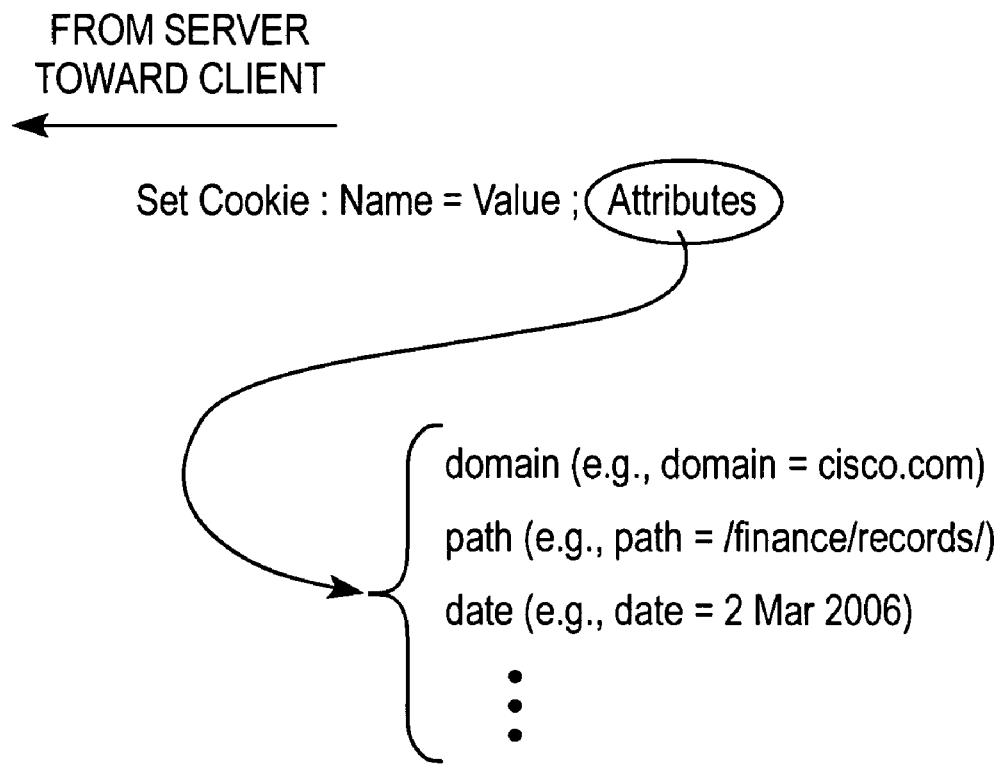
FIGS. 4A & 4B provide an example of cookie access control lists as utilized in accordance with yet another embodiment of the present invention.

FIGS. 4A & 4B illustrate the concept of cookie access control lists (ACLs) as utilized in accordance with yet another embodiment of the present invention. An access control list, as it is known in the computer arts, is simply a table that tells the computer operating system which access rights each user has to particular system object, such as a file directory were individual file. The list has an entry for each system user with access privileges. Common privileges include the ability to read a file, right to a file, and to execute the file. Each ACL has one or more access control entries (ACEs) consisting of the name of the user or group of users. For each of these users, groups, or rolls, the access privileges are stated in a string of lists called an access mask.

In accordance with another embodiment of the present invention, various parameters within the cookie structure, such as name value pairs and other attributes, are utilized to enforce certain access control policies; that is, certain policies to permit or deny traffic at the web application security device based on the granularity of information that exists or is provided within the cookie. By way of example, in the case where an employee within an organization attempts to access a restricted finance server using a cookie, that person may be restricted from accessing confidential files in the finance server. Thus, in certain instances the cookie functions not only to identify the session, but also the end application as well.

The example of FIG. 4A illustrates the creation of the cookie by the server (destined for the client) with various items of information, including the name and value of the cookie (i.e., name=value), along with other attributes. These attributes may specify a variety of information including, but not limited to, the domain (e.g., domain=cisco.com), path (e.g., path=/finance/records/), expiry date (e.g., date=2 Mar. 2006), etc. It should be understood that the name value pair and attribute information is specified from the server side. This information can be utilized as a selection mechanism for determining whether to encrypt and/or hash a particular cookie. Basically, this permits encryption and/or hashing based on a selection granularity in the transmission direction from server to client. For instance, a user can specify that the cookie is to be encrypted and hashed by the web application security device only if the domain=cisco.com and the path=finance.

Similarly, when a cookie comes back from the client side (see FIG. 4B) there are certain actions or sets of actions that can be applied by the web application security device to the incoming data based on the cookie name value pair that has been returned. For instance, certain name value pairs may be prevented or prohibited from entering certain servers; instead, these name value pairs may be routed to an alternative server (e.g., a specialized security server for performing deep packet inspection). By way of example, a user who has not visited a web site in a very long time may be redirected to a userID/login website in order to establish a new set of user credentials.

It should be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. For example, elements of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Furthermore, although the present invention has been described in conjunction with specific embodiments, those of ordinary skill in the computer networking arts will appreciate that numerous modifications and alterations are well within the scope of the present invention. For instance, in addition to tamperproofing (via hashing) and protecting against cookie structure mining (via encryption) the network security device of the present invention may also implement other security features/functions. Accordingly, the specification and drawings are to be regarded in an illustrative rather than a restrictive sense.

We claim:

1. A security device for inclusion in a network path between a client device and an application server, comprising:

a processor;

one or more programs that run on the processor for extracting a cookie from a data packet sent by the application server to the client device, the cookie being generated by the application server for storage on the client device, the one or more programs encrypting the cookie using a secret key and then sending the encrypted cookie to the client device via the network path, the one or more programs being further operable to decrypt the encrypted cookie using the secret key, thereby restoring the cookie when the encrypted cookie is sent back from the client device destined to the application server, the one or more programs then forwarding the cookie to the application server, wherein the one or more programs are further operable to add tag information to the encrypted cookie nor to sending the encrypted cookie to the client device, the tag information identifying operations performed on the cookie by the security device.

2. The security device of claim 1 wherein the one or more programs are further operable apply a hashing function to the cookie prior to encrypting the cookie.

3. A security device for inclusion in a network path between a client device and an application server, comprising:

a processor;

one or more programs that run on the processor for extracting a cookie from a data packet sent by the application server to the client device, the cookie being generated by the application server for storage on the client device, the one or more programs calculating a keyed hash value of the cookie and altering the cookie with the hash value, then sending the altered cookie to the client device via the network path, the one or more programs being further operable to verify the keyed hash value of the cookie when sent from the client device destined to the application server and once verified forward the cookie to the application server, wherein the one or more programs are further operable to add tag information to the altered cookie prior to sending the altered cookie to the client device, the tag information identifying operations performed on the cookie by the security device.

4. The security device of claim 3 wherein the one or more programs are further operable to encrypt the altered cookie using a secret key, and then send the altered/encrypted cookie to the client device.

5. The security device of claim 3 wherein the security device is located at a gateway to the application server.

6. A security device for a network comprising:
an interface; and
means for extracting a cookie from a data packet received at the interface, the data packet being sent by a server destined to a client, the cookie including a name value pair and one or more attributes, the means also for encrypting the cookie depending upon a selected setting of the one or more attributes and for sending the encrypted cookie to the client for storage thereon, the means is also for decrypting the encrypted cookie upon return back from the client destined for the server, the means also for adding tag information to the encrypted cookie prior to sending the altered cookie to the client device, the tag information identifying operations performed on the cookie by the security device.

7. The security device of claim 6 wherein the means is also for calculating a hash value of the cookie and altering the cookie with the hash value prior to encryption of the cookie.

8. A computer-implemented method of operation for a network device that connects a client with a server, the method comprising:
extracting a cookie from a data packet sent by a server destined to a client;
calculating a hash value of the cookie;
altering the cookie with the hash value;
encrypting the altered cookie using a secure key;
adding tag information to the altered/encrypted cookie prior to sending the altered/encrypted cookie to the client device, the tag information identifying the altering and encrypting operations performed on the cookie; and
sending the altered/encrypted cookie to the client device via the network.

9. The computer-implemented method of claim 8 further comprising:
receiving the altered/encrypted cookie sent back from the client device destined to the server;
reading the tag information to determine the altering and encrypting operations performed on the cookie;
decrypting the altered/encrypted cookie using the secure key;
verifying the hash value of the altered/decrypted cookie; and
forwarding the verified, altered/decrypted cookie to the server.

10. A memory encoded with a computer program for network security, execution of the computer program operable to:
inspect data packet traffic outgoing from a data center that includes an application server, the data packet traffic including a data packet destined for a client device, the data packet containing a cookie created by the application server;
extract the cookie from the data packet;
calculate a hash value of the cookie;
alter the cookie with the hash value;
encrypt the altered cookie using a secure key;
add tag information to the altered/encrypted cookie prior to sending the altered/encrypted cookie to the client device, the tag information identifying operations performed on the cookie; and
send the altered/encrypted cookie to the client device for storage thereon.

11. The computer-readable memory of claim 10 wherein execution of the computer is further operable to:
decrypt the altered/encrypted cookie using the secure key when the altered/encrypted cookie is sent back from the client device destined to the server;
verify the hash value from the altered/decrypted cookie; and
forward the verified, altered/decrypted cookie to the server.

12. The computer-readable memory of claim 10 wherein execution of the computer is further operable to:
decrypt the altered/encrypted cookie using the secure key when the altered/encrypted cookie is sent back from the client device destined to the server; and
forward the altered/decrypted cookie to the server.

\* \* \* \* \*